United States Patent [19]

Bastioli et al.

[11] Patent Number: 4,560,522

[45] Date of Patent: Dec. 24, 1985

[54] PROCESS FOR PREPARING POLY-PIPERAZINAMIDE ANISOTROPIC SHAPED ARTICLES

[75] Inventors: Catia Bastioli; Giuseppe Gianotti; Adriano Mattera; Paolo Parrini, all of Novara, Italy

[73] Assignee: Montedison S.p.A., Milan, Italy

[21] Appl. No.: 509,655

[22] Filed: Jun. 30, 1983

[30] Foreign Application Priority Data

Jul. 1, 1982 [IT] Italy ................................ 22179 A/82

[51] Int. Cl.$^4$ ......................... B29D 27/04; D01F 6/00
[52] U.S. Cl. ...................................... 264/41; 264/184; 264/209.1; 264/345; 264/561
[58] Field of Search .............. 264/561, 41, 184, 209.1, 264/216, 345

[56] References Cited

U.S. PATENT DOCUMENTS

| | | | |
|---|---|---|---|
| 3,551,331 | 12/1970 | Cescon et al. | 210/500.2 |
| 3,710,945 | 1/1973 | Dismore | 210/500.2 |
| 3,878,109 | 4/1975 | Ikeda et al. | 264/41 |
| 4,087,388 | 5/1978 | Jensen et al. | 264/41 |
| 4,340,479 | 7/1982 | Pall | 264/41 |

FOREIGN PATENT DOCUMENTS

| | | | |
|---|---|---|---|
| 50-107210 | 8/1975 | Japan | 264/184 |
| 53-143725 | 12/1978 | Japan | 264/184 |

OTHER PUBLICATIONS

Hill, Rowland; Fibres from Synthetic Polymers, Elsevier, N.Y. 1953, p. 381.

*Primary Examiner*—Donald Czaja
*Assistant Examiner*—Hubert C. Lorin

[57] ABSTRACT

Process for preparing poly-piperazinamide, anisotropic shaped articles comprising the preparation of the polymer solution in a polar organic solvent, the transformation of the solution into shaped bodies by spreading or spinning, the gelation of the shaped articles by phase inversion, and, optionally, the heat treatment of the gellified shaped articles.

7 Claims, No Drawings

PROCESS FOR PREPARING POLY-PIPERAZINAMIDE ANISOTROPIC SHAPED ARTICLES

BACKGROUND OF THE INVENTION

The present invention relates to a process for the preparation of poly-piperazinamide anisotropic shaped articles suitable for ultrafiltration and for reverse osmosis.

With the term "poly-piperazinamides", as used in the present description and relative claims, are intended all polycondensed products of piperazine or piperazine alkyl-substituted, optionally in admixture with other diamines, with anhydrides or dichlorides of saturated or unsaturated aliphatic, aromatic or heterocyclic di-carboxylic acids, such as, for instance, fumaric acid, mesaconic acid, adipic acid, phthalic acid, isophthalic acid, ring substituted phthalic acids or heterocyclic acids derived from furazane, thio-furazane, pyridine, thiophene and the likes, either by themselves or in admixture with each other. These polypiperazinamides are disclosed in U.S. Pat. Nos. 3,687,842; 3,743,596; 3,743,597; 3,696,031; 4,129,559 and 4,123,424.

The term "anisotropic shaped article" comprises flat membranes and hollow fibers having a dense and homogeneous layer which makes possible a high repelling solute capacity, and an underlying porous layer acting as a support.

DESCRIPTION OF THE PRIOR ART

It is known that polypiperazinamides are suitable for the preparation of anisotropic membrane with excellent salt-rejection characteristics as well as high water fluxes.

As is well known, the preparation process for such anisotropic membrane from polypiperazinamides, consists in: preparing a solution of said polymers in an organic polar solvent, in the presence of a saline component; spreading said solution; partially evaporating the solvent by heating; coagulating the membrane in an aqueous coagulation medium, and, if deemed necessary, subjecting the membrane to a heat-treatment.

This process allowed excellent anisotropic membranes, but showed some technological and cost drawbacks. In fact, the partial evaporation of the solvent from the solution just spread, involves a considerable waste of energy, the use of an oven of suitable size and, moreover, environmental pollution problems.

SUMMARY OF THE INVENTION

The object of the present invention is to provide a process for the preparation of polypiperazinamide anisotropic shaped articles not showing the above indicated drawbacks.

We have found that this and other objects are achieved by a process consisting of:

(a) preparation of a polypiperazinamide solution in an organic polar solvent;

(b) transformation of the solution into shaped articles by spreading said solution into or on a flat or tubular support, or by extrusion through a spinneret for obtaining hollow fibers;

(c) gelation of the shaped body by phase inversion by passage through a coagulation bath; and, optionally, (d) thermal treatment of the shaped articles thus obtained.

The support may be a glass or metal plate, fabric, synthetic polymer film etc.

Phase (a): Preparation of the solution. The polypiperazinamide solution may be prepared according to known techniques. Thus, for instance, the solvent and polypiperazinamide mixture is subjected to mechanical stirring with a contemporaneous heating up to a temperature, generally comprised between 20° C. and boiling or degradation temperature of the solvent, preferably not exceeding 200° C. The solution thus obtained is then filtered through a porous membrane or other known filtering means.

The used solvents are organic polar solvents miscible with water and belonging to classes m and s of the solvents forming hydrogen bonds (m—H s—H bonding groups) and having a solubility parameter $\delta > 8 (cal/cc)^{\frac{1}{2}}$, according to the classification given by H. Burrel in Polymer Handbook IV-341, J. Brandrup, E. N. Immergut, Editor, Interscience, N.Y.

Some examples of such solvents are: dimethylformamide, dimethylacetamide, diethylformamide, diethylacetamide, dimethylsulphoxide, N-methylpyrrolidone, dioxane, acetic acid, formic acid etc. Mixtures of the above solvents may be used.

The concentration of the polypiperazinamide in the solution may range from 5% to 30% by weight, but it is preferably comprised between 8% and 25% by weight with respect to the solution.

An inorganic salt or an organic substance, either solid or liquid, with a high boiling point, may be also added to the solution in quantities not exceeding 5% by weight with respect to the solution.

Phase (b): Transformation of the solution into shaped articles. The solution obtained in phase (a) is transformed into shaped articles either by spreading or by extrusion.

The spreading may be carried out in various ways: for instance the solution may be spread onto a support by means of a filmspreader, so as to form a thin layer of solution on the support.

As a support, any material may be used, such as for instance: a glass plate, a metal plate, a polyethylenterephthalate film, and other materials, such as fabrics that may remain incorporated into the article thus forming a support for the membrane.

For producing a tubular-shaped membrane, the polypiperazinamide solution is extruded into the inner part of a tube used as a support.

For spreading the solution on the outside of a tube used as a support, this latter, closed at either one or at both ends, is dipped into the polypiperazinamide solution. Alternatively, the polypiperazinamide solution may be spread in a uniform way over the outside surface of the tube.

The thickness of the casting film may vary within a wide range and, generally, it is comprised between 0.02 and 0.8 mm.

The spinning of the solution of phase (a), is carried out by extrusion through a spinneret provided with a plurality of holes each one having an orifice, for the feeding of the hole-maker, and a concentrical ring for the feeding of the polymeric solution.

The shaped articles thus obtained are hollow fibers with an outside diameter comprised between 0.080 mm and 1 mm and with an inner diameter ranging from 0.040 to 0.5 mm, depending on the use for which the hollow fiber is intended, that is, in the field of reverse osmosis or in the field of ultrafiltration.

Phase (c): gelation of the shaped article by phase inversion.

The shaped article obtained in phase (b), in the form of a thin layer of solution spread over a flat or tubular support or in the form of hollow fibers, is immersed into a bath consisting of a polymer non-solvent, miscible with the solvent used for the preparation of the solution, so as to cause the gelation by phase inversion.

The selection of the non-solvent is of fundamental importance for the formation of anisotropic structures suitable for the uses intended for the membrane or hollow fiber.

Thus, for instance, water, although being a polymer non-solvent and miscible with the solvents used in the preparation of the solution, confers an anisotropic structure with large fingers suitable for ultrafiltration or for low pressure processes.

Some preferred polymer non-solvents suitable for obtaining the best results in the formation of the dense layer for reverse osmosis, are:

1. Polyfunctional alcohols such as: ethyleneglycol, propyleneglycol, etc., glycerin etc., both alone or in admixture with water not exceeding 20% by weight; or
2. aqueous solutions of electrolytes such as: alkaline or alkaline-earthy metal halides, nitrates, acetates etc., in concentrations comprised between 10 and 40% by weight.

The gelation by phase inversion, may also be obtained by using aqueous solutions of the same solvent used for the polymer solution, in a water/solvent weight ratio comprised between 20:80 and 40:60. The use of such non-solvents, however, gives rise to membranes having a lower asymmetric structure.

In the case the shaped article should be used in the field of ultrafiltration or low pressure processes, the suitable non-solvents may be: water, aqueous solutions of a polyfunctional alcohol or aqueous solutions of the polymer solvent used for the solution having a water content greater than 40% by weight, or aqueous solutions of an electrolyte in a concentration not exceeding 10% by weight.

The bath containing the polymer non-solvent, in which the gelation occurs by phase inversion, may be maintained at a temperature comprised between $-20°$ C. and $+40°$ C., and the immersion time shall be comprised between 1 and 120 minutes.

In this phase the asymmetric structure of the shaped articles is formed.

Phase (d): optional heat treatment.

The membranes or shaped articles thus obtained, sometimes have not yet fully suitable reverse osmosis characteristics; for instance, the flux may be very high, as for instance 2500 lt/m$^2$.day, but the saline rejection will be rather low, for instance lower than 50%, determined by using an aqueous saline solution containing 10,000 p.p.m. of NaCl, at a pressure of $6 \times 10^6$ Pascal and at 20° C. In order to achieve, if wished, a considerable and lasting increase of the desalting properties of the membrane, this latter may be subjected to a heat treatment. The heat treatment may be carried out by several methods.

According to a preferred method, the membranes are first immersed in ethylene glycol at room temperature, for a period comprised between 3 and 12 hours, they are then kept in the same bath for a period of time comprised between 1 and 120 minutes, but preferably between 10 and 60 minutes, at a temperature comprised between 40° C. and 100° C.

The ethylene glycol may be substituted by any other glycol or by glycerin.

The anisotropic membranes obtained according to the process of the present invention, are characterized by a saline rejection even greater than 99%, with flows equal to or greater than 600 lt/m$^2$.d, using an aqueous saline solution containing 10,000 p.p.m. of NaCl, at a pressure of $6.10^6$ Pascal at 20° C.

Those membranes, moreover, due to their polymeric structure, show a peculiar resistance to packing by the action of pressure which involves a long working time. This particular resistance to packing makes these membranes particularly suitable for the desalting of sea water, where higher pressures are required.

Moreover, the membranes obtained according to the process of the present invention are particularly effective in various separation and concentration processes in which reverse osmosis or ultrafiltration processes are applied such as polluted waters, inorganic or organic solute recovery; foodstuff solution treatment, such as milk, coffee, tea, citrus-juices, whey, tomato-juices, sugary solutions, azeotropes separation and biological and pharmaceutical product concentration, such as hormones, proteins, vitamins, antibiotics, vaccines, aminoacids; and other similar processes.

The process, object of the present invention, makes possible to completely avoid the heat polymer solvent evaporation with obvious energetical and environmental pollution advantages.

The following non-limiting examples are given for a more detailed understanding of the present invention and for further enabling those skilled in the art to practice the same.

EXAMPLE 1

Preparation of a reverse osmosis membrane 17 g of poly(trans-2,5-dimethyl-piperazin-thiofurazanamide) having an $\eta_{in}=2.78$ (determined at 30° C. with a solution of 0.5 g of polymer in 99.5 g of tetrachloroethane) were dissolved in 83 g of N-methyl-pyrrolidone.

This mixture was heated for 30 minutes in an oven at 80° C., and was then kept under stirring for 1 hour at a temperature comprised between 80° C. and 150° C.

The solution was then filtered under nitrogen pressure and degased for about 8 hours.

The degased solution was thereupon spread, at room temperature, over a glass plate to form a film showing a thickness of 300 microns.

The film supporting glass plate was then immersed for 20 minutes into a glycerin bath at 20° C.

A part of the thus obtained membrane (sample A) was immersed in water for about 1 hour. The remaining part of the membrane (sample B) was immersed in ethylene glycol for 12 hours at room temperature and for further 40 minutes at 80° C., and then it was immersed for 1 hour in distilled water, like sample A.

Each membrane, A and B, was placed into a reverse osmosis cell of a standard type, in which was pumped an aqueous solution containing 10,000 p.p.m. of sodium chloride.

Each membrane was placed in its cell taking care that the face turned to the solution to be desalted was that not-facing the glass plate during the spreading (positive side).

The saline rejection (SR) and the flux (F) obtained for samples A and B, under a pressure of 6.10⁶ Pascal, were:

|          | SR (%) | F (l/m² · d) |
|----------|--------|--------------|
| SAMPLE A | 70     | 1,000        |
| SAMPLE B | 98     | 700          |

EXAMPLE 2

Preparation of a reverse osmosis membrane

By following the process conditions described in example 1, a solution consisting of 20 g of poly(trans-2,5-di-methyl-piperazin-thiofurazanamide) and of 80 g of N-methyl-pyrrolidone, was spread on a glass plate to form a film having a thickness of 300 microns.

The film supporting glass plate was immersed for 40 minutes into a glycerin bath at $-10°$ C.

The membrane thus obtained was immersed into an ethylene glycol bath for 5 hours at room temperature and then for 30 minutes at 70° C.; whereafter it was immersed into distilled water for one hour.

The saline rejection values (SR) and the flux (F) determined on the membrane thus obtained under the same conditions of example 1, were:
SR = 90%; F = 600 lt/m².day.

EXAMPLE 3

Preparation of a supported membrane

The polymer solution, prepared according to the procedures of example 1, was spread over a non-woven fabric of polyester having a thickness of 100 $\mu$m, to form a film of 500 $\mu$m. The film supporting fabric was immersed for 20 minutes into a glycerin bath at 20° C. A part of the supported membrane thus obtained (sample A) was immersed into distilled water for about one hour. The remaining part of the supported membrane (sample B) was first immersed into an ethylene glycol bath for 8 hours at room temperature and for further 40 minutes at 70° C.; whereafter it was immersed into distilled water for about one hour.

Both samples, A and B, were characterized according to the method indicated in example 1 and showed the following values of saline rejections (SR) and fluxes (F):

|          | SR (%) | F (l/m² · day) |
|----------|--------|----------------|
| SAMPLE A | 75     | 900            |
| SAMPLE B | 93     | 600            |

EXAMPLE 4

Preparation of an ultrafiltration membrane

Operating according to the process conditions of example 1, a solution consisting of 21 g of poly(trans-2,5-dimethyl-piperazin-thio-furazanamide), having a $\eta_{in} = 1.71$, and of 79 g of dimethyl-acetamide, was prepared.

The solution was spread, at room temperature, over a glass plate to form a 300 microns thick film. The film supporting glass plate was immersed for 10 minutes into a 50% by weight of glycerin and 50% by weight of water bath.

The membrane thus obtained was immersed into water for about one hour.

The membrane was mounted into a cell for ultrafiltration, in which an aqueous solution containing 5000 p.p.m. of NaCl was circulated. Under a pressure of $5.10^5$ Pascal, the flux was about 3000 l/m².day.

EXAMPLE 5

Preparation of an ultrafiltration hollow fiber

Operating according to example 1, a solution was prepared consisting of:
13 g of poly(trans-2,5-dimethyl-piperazin-thio-furazanamide), having a $\eta_{in} = 2.8$;
4 g of lithium nitrate, and
83 g of N-methyl-pyrrolidone.

The solution was extruded, at room temperature through a spinneret for hollow fibers, the holes of the spinneret having an outer diameter of 1 mm and an inner diameter of 0.5 mm. As hole-maker was used isopropylmyristate fed at a rate of 0.75 cc/min. The solution was fed at 0.7 cc/min. The fibers coming out of the spinneret were coagulated in a bath consisting of an aqueous 5% by weight solution of $CaCl_2$ and was wound up at a rate of 30 m/min.

The fibers thus obtained showed an outside diameter of 200 $\mu$m and an inside diameter of 90 $\mu$m. The fibers were washed in water at room temperature for a few hours and then immersed for 3 hours in glycerin at room temperature.

By using a solution containing 5000 p.p.m. of NaCl and at a pressure of $5.10^5$ Pascal, the flux value of the fibers amounted to about 400 l/m².day.

What is claimed is:

1. A process for the preparation of polypiperazinamide anisotropic shaped articles suitable for reverse osmosis consisting of:
   (a) preparing a solution of a polypiperazinamide in an organic polar solvent;
   (b) transforming said solution into a shaped article by spreading it onto a flat or tubular support, or by extruding it through a spinneret for hollow fibers;
   (c) gelating the shaped articles by phase inversion, by passage thereof through a coagulating bath selected from the group consisting of polyfunctional alcohols, mixtures of polyfunctional alcohols with a quantity of water not exceeding 20% by weight, and aqueous solutions of electrolytes in a concentration of 10% to 40% by weight, and, optionally
   (d) heat-treating the shaped article thus obtained.

2. A process according to claim 1, wherein the solvents for the preparation of the spinning solution are miscible with water and belonging to classes m and s of the solvents forming hydrogen bonds (m-H and s-H bounding groups) and have a solubility parameter $>8$ (cal/cc) $\frac{1}{2}$.

3. A process according to claim 1, wherein the concentration of the solution (a) is comprised between 5% and 30% by weight.

4. A process according to claim 3, wherein the concentration of the solution is comprised between 8% and 20% by weight.

5. A process according to claim 1, wherein the solution (a) contains quantity not exceeding 5% by weight with respect to the solution of an inorganic salt or an organic compound with a high boiling point.

6. A process according to claim 1, wherein the coagulating bath is maintained at a temperature comprised between $-20°$ C. and $+40°$ C.

7. A process according to claim 1, in which the shaped article is subjected to heat treatment (d) by immersing the shaped article in a glycol or glycerin bath, keeping the bath first at room temperature for 3–12 hours, and then at a temperature of 40° C. to 100° C. for 1–120 minutes.

* * * * *